Figure 1:
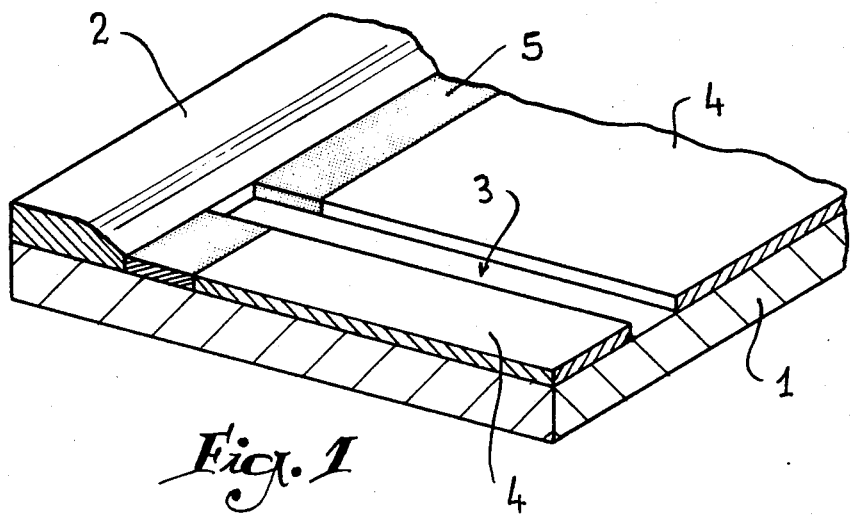

United States Patent [19] [11] Patent Number: 4,819,127
Gizolme et al. [45] Date of Patent: Apr. 4, 1989

[54] METALLIZED DIELECTRIC SHEET FOR MAKING CAPACITORS OF THE WOUND TYPE, AND CAPACITORS OBTAINED

[75] Inventors: Alain Gizolme, Sainte-Consorce; Jean-Bernard Aldeguer, Saint-Genis Laval, both of France

[73] Assignee: Belier Industries, Saint-Genis Laval, France

[21] Appl. No.: 212,787

[22] Filed: Jun. 29, 1988

[30] Foreign Application Priority Data

Jun. 29, 1988 [FR] France ............................ 87 10252

[51] Int. Cl.⁴ .......................................... H01G 1/015
[52] U.S. Cl. .................................................. 361/273
[58] Field of Search ............... 361/273, 275, 328, 330, 361/303, 304, 305, 306, 308, 309, 310, 323, 324, 326; 29/25.42

[56] References Cited

U.S. PATENT DOCUMENTS 3,014,167 12/1961 Winter et al. ................. 361/273 X
4,719,537 1/1988 Gizolme ............................. 361/273

FOREIGN PATENT DOCUMENTS 2579366 9/1986 France .............................. 361/273

Primary Examiner—Donald A. Griffin
Attorney, Agent, or Firm—Dowell & Dowell

[57] ABSTRACT

This invention relates to a metallized dielectric sheet for making capacitors of the wound type, wherein the longitudinal zone which joins the transverse gaps along the thickened edge and which is intended to melt before the metallized compartments are damaged further to a puncture when the capacitor obtained is first charged, is made of a metal or alloy different from the one forming said compartments and edge.

2 Claims, 1 Drawing Sheet

U.S. Patent  Apr. 4, 1989  4,819,127

METALLIZED DIELECTRIC SHEET FOR MAKING CAPACITORS OF THE WOUND TYPE, AND CAPACITORS OBTAINED

The present invention relates to a metallized dielectric sheet for making capacitors of the wound type, and to capacitors obtained.

Electric capacitors of the wound type are conventionally made by winding on themselves two dielectric sheets of which each is formed by a flexible support film made of paper or synthetic material and by conductive armatures. At the present time, these armatures are obtained by depositing, for example by vaporization, on one of the faces of the support film, a fine layer of metal, which layer may then be subjected to a treatment in order to obtain a pattern on said armatures.

In practice, each sheet presents along one of its longitudinal edges a non-metallized band or bare margin, whilst, on the opposite edge, the layer of metal may, on the contrary, be considerably thicker. Furthermore, in order to facilitate auto-regeneration or cicatrization, narrow, non-metallized separating bands or gaps are provided, which extend transversely, thus defining separate compartments. Finally, still with a view to improving auto-regeneration, there are provided on the sheet one or more non-metallized bands, oriented longitudinally and presenting a discontinuous profile, in order to determine a series of fusible connecting bridges adapted to limit the ½ VC2 energy to an acceptable value in the event of puncture of the dielectric.

In practice, the production of such interrupted bands poses a fairly delicate problem. Applicants' French patent application No. 86 06229 filed on Apr. 25, 1986, proposes replacing this discontinuous band by a narrow zone having a much reduced thickness of metal, said zone, directly obtained continuously during metallization of the relevant face of the support film, being oriented longitudinally along the thick edge in order to intersect the compartmentation gaps.

A longitudinal zone is consequently produced which, in the event of puncture of the dielectric, is capable of melting on attaining its temperature of fusion for a limited value of current. Such fusion causes the relevant zone to disappear before the rest of the metallization is damaged.

It is an object of the present invention to provide another embodiment of such a fusible zone.

According to the invention, the support film is provided, along the thick metallized edge, with a longitudinal zone which is constituted by a metal or metal alloy different from that covering the rest of the surface of said support film, this metal or alloy being selected so as to present a fusibility higher than that of the metal constituting the metallization.

The result obtained is identical to that described in patent application No. 86 06229 mentioned above, whilst manufacture of the dielectric sheets is simplified.

The invention will be more readily understood on reading the following description with reference to the accompanying drawings, in which:

FIG. 1 is a section on a large scale schematically showing a dielectric sheet according to the present invention.

Figure 2:
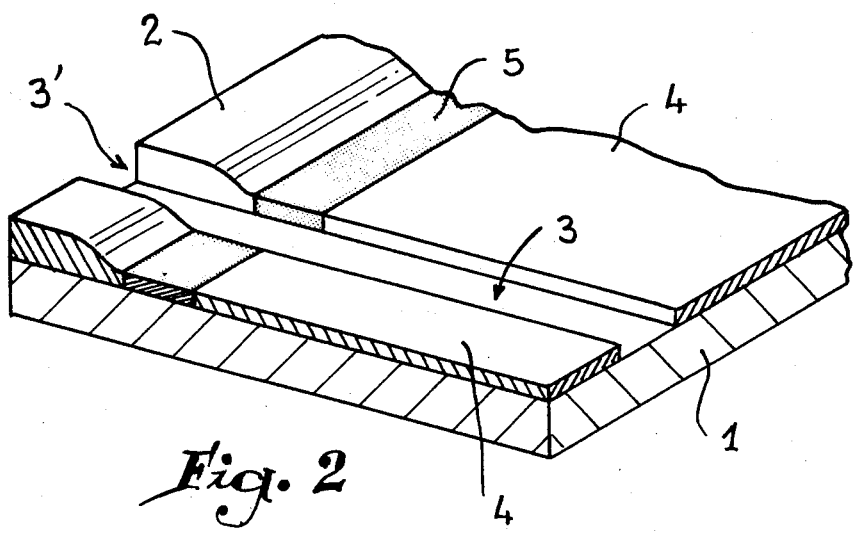

FIG. 2 similarly illustrates a variant thereof.

Referring now to the drawings, the flexible support film, for example made of paper, is designated by reference 1 and comprises on one of its faces a metallized layer which presents, along the longitudinal edge opposite the one (not shown) occupied by the conventional bare margin, an excess thickness adapted to determine the thickened edge 2. This metallized layer is conventionally interrupted at regular intervals by transverse bands or gaps 3 which define a series of separate compartments 4.

According to the invention and as illustrated in FIG. 1, there is provided along the thick edge 2 a longitudinal zone 5 which is constituted by a metallized layer made of a metal or alloy different from that forming the compartments 4 and said edge 2, it being observed that the metal or alloy selected for this band 5 presents a fusibility higher than that of the metal which constitutes the metallization.

In order to illustrate the foregoing by a precise example which, however, is in no way limiting, if the compartments 4 and the thick edge 2 are made of zinc or aluminium, the longitudinal band 5 may be obtained by a layer of silver presenting a substantially equivalent thickness.

It will be understood that, in the event of puncture of the wound capacitor conventionally obtained by winding two dielectric sheets of which at least one is in accordance with the invention, disposed in inverted manner with a slight transverse offset, the longitudinal zone 5 disappears by fusion before the rest of the metallization is damaged by the simple passage of the fault current resulting from the puncture, consequently allowing insulation of that portion included between two successive gaps 3 and which is the seat of the puncture, under conditions very similar to those obtained with the aid of the zone of small thickness in accordance with patent application No. 86 06229, since in both cases it is question of providing the metal conductive layer with a discontinuity.

The variant embodiment shown in FIG. 2 differs from the embodiment illustrated in FIG. 1 only by the fact that the gaps 3 extend at 3' beyond the zone 5 and affect the thick edge 2, thus facilitating cleaning of the gaps by application of voltage between two successive gaps, as insulation is sometimes doubtful due to the presence of islets.

It must, moreover, be understood that the foregoing description has been given only by way of example and that it in no way limits the domain of the invention which would not be exceeded by replacing the details of execution described by any other equivalents. In particular, the invention covers not only the metallized dielectric sheets of the type described hereinabove, but also the wound capacitors obtained from such sheets.

What is claimed is:

1. In a metallized dielectric sheet for making wound capacitors, of the type comprising a support film coated, on one of its faces, with a layer of metal which defines a thickened edge and a series of compartments separated from one another by transverse gaps which, along the thick edge, are joined to one another by a conductive longitudinal zone adapted to melt under the effect of the discharge created by a possible puncture of the dielectric, before the rest of the metallized layer is itself damaged, the longitudinal zone is made of a metal or alloy different from that of the rest of the layer and presents a fusibility higher than that of the metal constituting the metallization.

2. A wound capacitor, of the type obtained by winding metallized dielectric sheets, wherein it is made by means of at least one sheet of claim 1.

* * * * *